(12) United States Patent
Altmann et al.

(10) Patent No.: US 10,268,230 B2
(45) Date of Patent: Apr. 23, 2019

(54) ACTUATING ASSEMBLY FOR AN OPERATING ELEMENT, STEERING COLUMN SWITCH, AND STEERING COLUMN ASSEMBLY

(71) Applicant: TRW Automotive Electronics & Components GmbH, Radolfzell (DE)

(72) Inventors: Markus Altmann, Moos (DE); Peter Schulte, Radolfzell (DE)

(73) Assignee: TRW AUTOMOTIVE ELECTRONICS & COMPONENTS GMBH, Radolfzell (DE)

( * ) Notice: Subject to any disclaimer, the term of this patent is extended or adjusted under 35 U.S.C. 154(b) by 222 days.

(21) Appl. No.: 14/433,878

(22) PCT Filed: Oct. 22, 2013

(86) PCT No.: PCT/EP2013/072059
§ 371 (c)(1),
(2) Date: Apr. 7, 2015

(87) PCT Pub. No.: WO2014/067813
PCT Pub. Date: May 8, 2014

(65) Prior Publication Data
US 2015/0277480 A1      Oct. 1, 2015

(30) Foreign Application Priority Data
Oct. 29, 2012   (DE) .......................... 10 2012 021 261

(51) Int. Cl.
*G05G 5/06*   (2006.01)
*B60Q 1/14*   (2006.01)
*G05G 1/04*   (2006.01)

(52) U.S. Cl.
CPC ............. *G05G 5/06* (2013.01); *B60Q 1/1469* (2013.01); *G05G 1/04* (2013.01); *Y10T 74/20606* (2015.01); *Y10T 74/20636* (2015.01)

(58) Field of Classification Search
CPC ............ G05G 5/06; G05G 1/04; H01H 21/02; H01H 3/16; B60Q 1/1469
(Continued)

(56) References Cited

U.S. PATENT DOCUMENTS 6,300,852 B1 * 10/2001 Kato .................... B60Q 1/1469
                                                      200/327
2004/0144630 A1    7/2004 Heinze et al.
2006/0185467 A1 *  8/2006 Giefer .................... F16H 61/24
                                                      74/532

FOREIGN PATENT DOCUMENTS

DE           10148554          3/2003
DE           10160801      *   6/2003   ............. H01H 25/04
(Continued)

*Primary Examiner* — Edwin A. Leon
*Assistant Examiner* — Iman Malakooti
(74) *Attorney, Agent, or Firm* — Tarolli, Sundheim, Covell & Tummino LLP

(57) ABSTRACT

In an actuating assembly (16) for a control element in a vehicle, in particular for a steering column stalk (10), having an actuating element (18) that is adapted to be shifted in an actuating direction (B), and a seat (20) in which the actuating element (18) is supported for being shifted hi the actuating direction (B) between a basic position and at least one actuation position, at least one separate spring element (28) is provided between the seat (20) and the actuating element (18) and presses on the actuating element (18) by a spring force (F) acting substantially transversely to the actuating direction (B).

21 Claims, 3 Drawing Sheets

(58) Field of Classification Search
USPC .................. 200/61.54–61.57, 61.27–61.35
See application file for complete search history.

(56) References Cited

FOREIGN PATENT DOCUMENTS

| | | | | |
|---|---|---|---|---|
| DE | 102007008960 | * | 8/2008 | ............ B60K 20/02 |
| DE | 102009058719 | | 6/2011 | |
| JP | S50-31528 | | 3/1975 | |
| JP | S62-28222 | | 2/1987 | |
| WO | 2005/031491 | | 4/2005 | |

* cited by examiner

ACTUATING ASSEMBLY FOR AN OPERATING ELEMENT, STEERING COLUMN SWITCH, AND STEERING COLUMN ASSEMBLY

RELATED APPLICATIONS

This application corresponds to PCT/EP2013/072069, filed Oct. 22, 2013, which claims the benefit of German Application No, 10 2012 021 261.5, filed Oct. 29, 2012, the subject matter, of which are incorporated herein by reference in their entirety.

BACKGROUND OF THE INVENTION

The present invention relates to an actuating assembly for a control element in a vehicle, in particular for a steering column stalk, including an actuating element that is adapted to be shifted in an actuating direction between a basic position and at least one actuation position, and a seat in which the actuating element is shiftably supported. The invention further relates to a steering column stalk for a vehicle and a steering column stalk assembly.

In many vehicles provision is made for steering column stalks, which may be made use of to control a variety of vehicle functions such as, e.g., a windshield wiper or a direction indicator. The steering column stalk is typically arranged for swiveling or pivoting motion in a vehicle-fixed bearing and includes an actuating element that is supported in a seat so as to be shifted in the longitudinal direction of the steering column stalk. The vehicle-fixed bearing is provided with a detent cam surface into which the actuating element is pressed by a spring. Various non-locking keys or contacts for the actuating element may be provided in the detent cam surface. When the steering column stalk is pivoted, the actuating element is shifted on the detent cam surface; in the process, a non-locking key can be operated or an electric connection can be established via a contact, and in this way different vehicle functions can be enabled or disabled.

To avoid undesirable rattling noises and to increase ease of operation, it is required that the steering column stalk and the actuating element should be supported with as little clearance as possible. On the other hand, no excessive friction must be produced between the actuating element and the seat since otherwise the operating forces would increase.

Disclosed in the prior art are actuating assemblies in which portions of the seat or the actuating element are made to be elastic and the actuating element is elastically clamped in the seat. One drawback of these actuating assemblies is the high friction between the actuating element and the seat. Furthermore, due to the friction involved, they are subject to high wear, so that as the service life progresses, friction is reduced and clearance increases. Reducing the clearance is only possible by exchanging the entire stalk.

SUMMARY OF THE INVENTION

It is the object of the invention to provide an actuating assembly for a steering column stalk, which exhibits a small clearance of the actuating element over the entire service life. A further object of the invention is to provide a steering column stalk and a steering column assembly having such an actuating assembly.

To achieve the object, in an actuating assembly for a steering column stalk, including an actuating element that is adapted to be shifted in an actuating direction between a basic position and at least one actuation position, and a seat in which the actuating element is shiftably supported, provision is made for at least one separate spring element between the seat and the actuating element, the spring element pressing on the actuating element by a spring force acting substantially transversely to the actuating direction. The actuating element and the seat are configured to be rigid. The reduction in clearance between the seat and the actuating element is effected exclusively by the spring element which is arranged within the seat and presses the actuating element against the inner wall of the seat. Such a spring element allows any desired adjustment of the spring force acting between the seat and the actuating element, so that a precise adjustment of the freedom from clearance and of the friction acting between the seat and the actuating element is possible. In addition, a separate spring element has the advantage that it can be exchanged by simple means in the event of a decrease in spring force. Furthermore, any wear-induced clearance between the seat and the actuating element can be compensated for by the spring element.

Preferably, guide members that are located substantially opposite the spring element are provided in the seat, the actuating element being pressed against the guide members by the spring element. These guide elements may, for example, be coated such that the friction between the actuating element and the seat is reduced, whereby the actuating element is supported in the seat with low friction. Moreover, the actuating element preferably rests exclusively against the guide members and is not in surface contact with the inner wall of the seat.

The spring element extends, for example, within the seat in the actuating direction and rests against the inner wall of the seat at least in sections. The spring element is supported at the inner of the seat, so that no additional parts are required for mounting the spring element.

The spring element preferably includes protruding sections which project from the we of the seat and rest against the actuating element. The spring element has in particular an undulating configuration, so that individual sections of it rest against the inner wall of the seat and protruding sections of it rest against the spring element. The shape and the height of the undulating spring may be made use of for adjusting the spring force as desired.

At least one projection and/or one depression may be provided on the actuating element. The spring element rests by a protruding section against a projection in the basic position of the actuating element, and/or rests in a depression in an actuation position, for example. Owing to the spring element, which presses the actuating element against the inner wall of the seat, a higher friction is produced between the actuating element and the seat, so that the actuating force for shifting the actuating element increases. When the protruding sections of the spring element move into a depression or are pushed away by a projection, the spring will relax and in this way reduce the friction between the actuating element and the seat. As a result, the actuating force present in the actuation position is lower, but, irrespective of the position of the actuating element, a sufficiently high spring force is exerted on the actuating element, so that it is held within the seat free of clearance.

In such an embodiment, a ramp for the protruding section of the spring element is preferably provided between a projection and a depression located behind the projection in the actuating direction, by which the protruding section can be guided between the projection and the depression. When the protruding section of the spring element moves onto this inclined ramp, the spring element exerts a lower release force on the actuating element in the actuating direction, by which a holding force produced by the frictional resistance is reduced, so that the actuating element can be moved by applying a lower actuating force.

The spring element may be a bent sheet metal part, for example, which in particular is pre-bent in an undulating shape. In the case of spring elements made of a plastic material, the spring tension may deteriorate in the course of the service life due to the viscoelastic behavior of the plastic material or due to other ageing phenomena. A bent sheet metal part offers the advantage that the pretender of the spring element will not, or only slightly, deteriorate over the service life.

The seat is made to be rectangular or square, for example. The spring element may be arranged at one corner of the square and press the actuating element into the opposite corner of the square. In such an embodiment, one spring element is sufficient for mounting the actuating element free of clearance. Guide elements may be provided on each of the surfaces of the seat which are adjacent to the corner into which the actuating element is pressed. But it is also conceivable that two spring elements are provided, which are more particularly arranged offset by 90 degrees in the circumferential direction. They may be arranged on two adjacent surfaces of the square seat, for example, and press the actuating element against the respective opposite surface.

The spring elements may be formed in one piece, so that only one attachment for the spring elements is necessary within the seat. Where the spring element is a bent sheet metal part, it may have two mutually perpendicularly arranged arms, for example, which are each bent over at a right angle.

According to the invention, further provision is made for a steering column stalk having an actuating assembly according to the invention. The seat of the actuating assembly is preferably provided on the actuating stalk and in particular formed integrally therewith.

According to the invention, further provision is made for a steering column stalk assembly having a steering column stalk according to the invention and a vehicle-fixed bearing for accommodation of the mounting of the steering column stalk, the bearing including a detent cam surface into which the actuating element can engage.

BRIEF DESCRIPTION OF THE DRAWINGS

Further advantages and features will be apparent from the description below in conjunction with the accompanying drawings, in which.

DESCRIPTION

Figure 1:
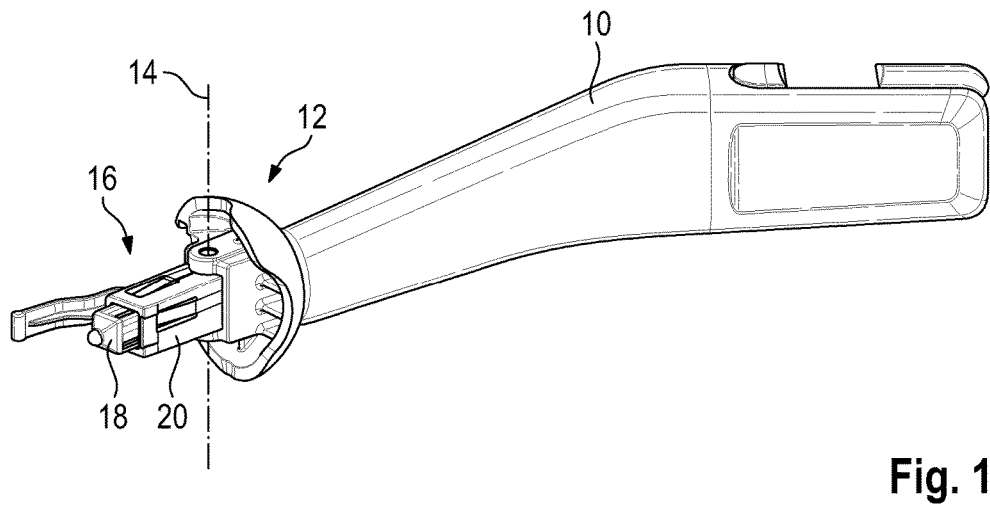
FIG. 1 shows a steering column stalk in accordance the invention.

FIG. 1 shows a steering column stalk 10 for a vehicle. The steering column stalk 10 includes a mounting 12 by which the steering column stalk 10 can be mounted at a vehicle-fixed bearing so as to swivel about a swivel axis 14.

The steering column stalk 10 further includes an actuating assembly 16 having an actuating element 18. The actuating element 18 engages into a detent cam surface on the vehicle-fixed bearing, the detent cam surface having non-locking keys or contacts provided therein. When the steering column stalk 10 is swiveled, the actuating element 18 operates these non-locking keys or engages the contacts, whereby a variety of vehicle functions such as, e.g., a windshield wiper may be controlled.

Figure 2:
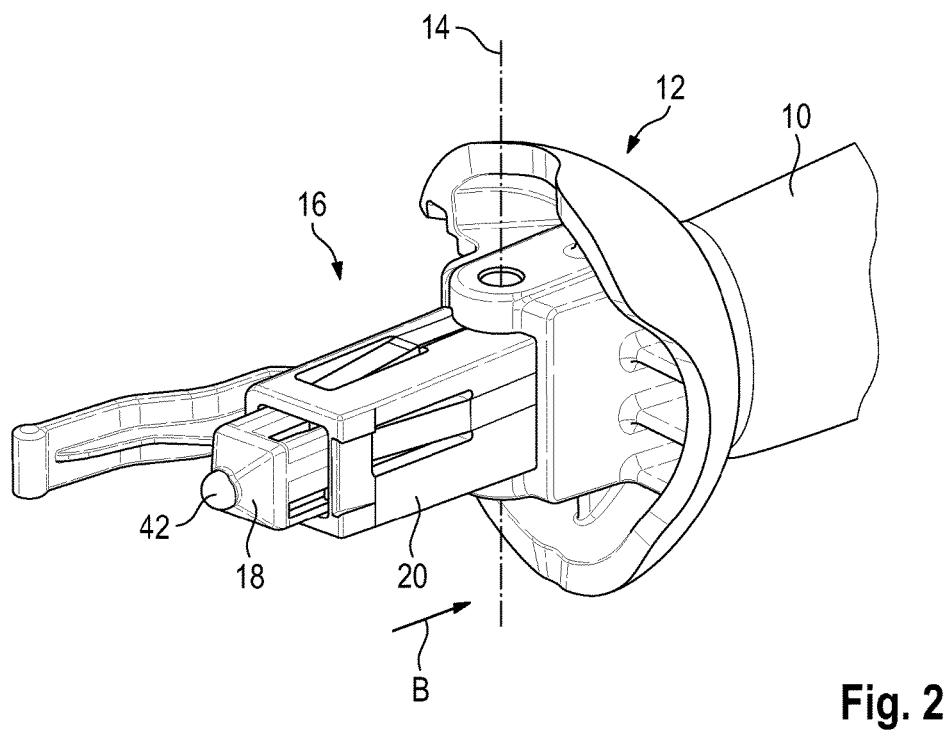
FIG. 2 shows a detail view of the actuating assembly of the steering column stalk of FIG. 1.

The actuating assembly 16 has a seat 20 which is formed integrally with the steering column stalk 10 here (see also FIG. 2). As can be seen in particular in FIGS. 3 and 4, the seat 20 has a rectangular or square shape in cross-section and includes an accommodation space 22 extending in an actuating direction B, in which the actuating element 16 is mounted for being shifted in the actuating direction B.

Figure 3:
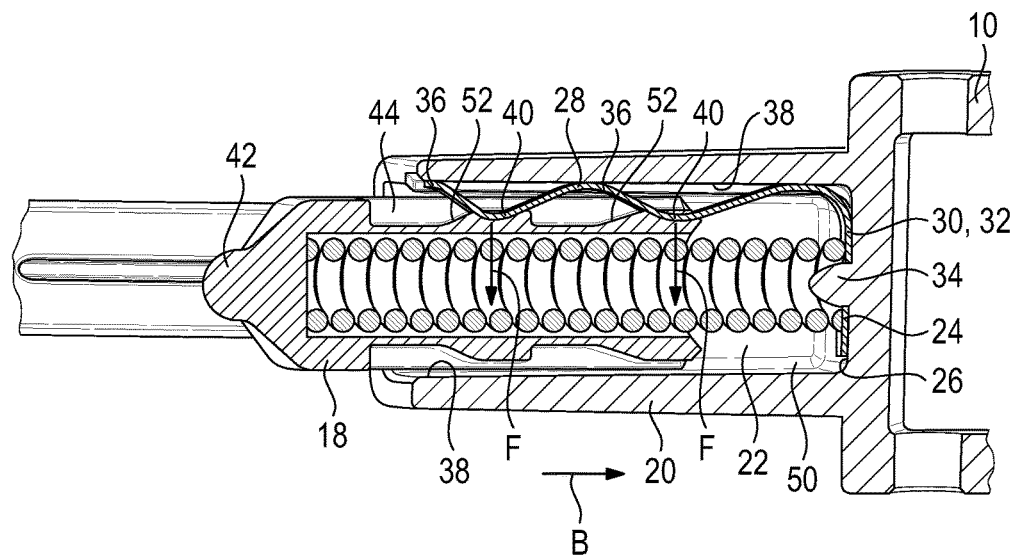
FIG. 3 shows a sectional view of the actuating assembly of FIG. 2.

Provided in the accommodation space 22 is a spring 24 which is supported against a front face 26 of the seat 20 and urges the actuating element 18 contrary to the actuating direction B into a basic position shown in FIG. 3. When the steering column stalk 10 is swiveled, the actuating element 18 can be shifted from this basic position to an actuation position by the detent cam surface in the actuating direction B.

Figure 4:
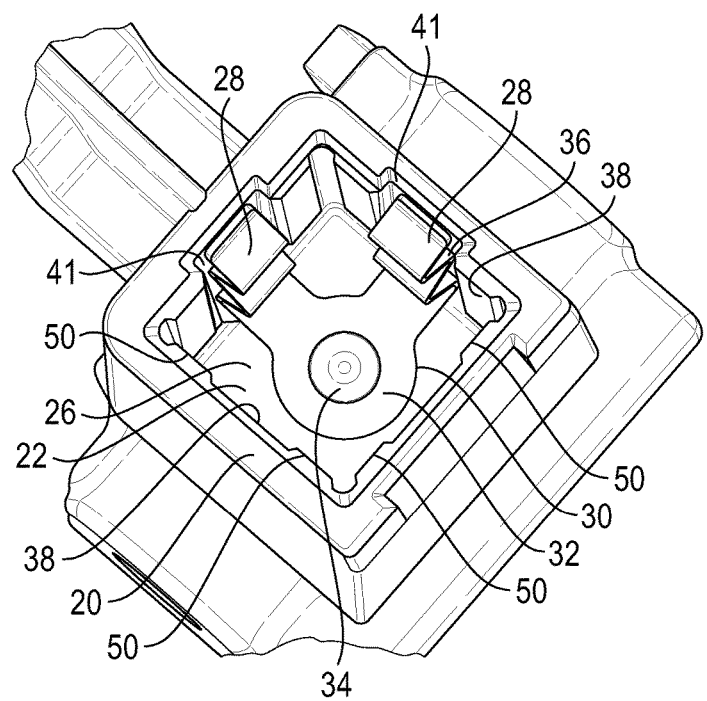
FIG. 4 shows a perspective view of the seat of the actuating assembly of FIG. 2.
Figure 5:
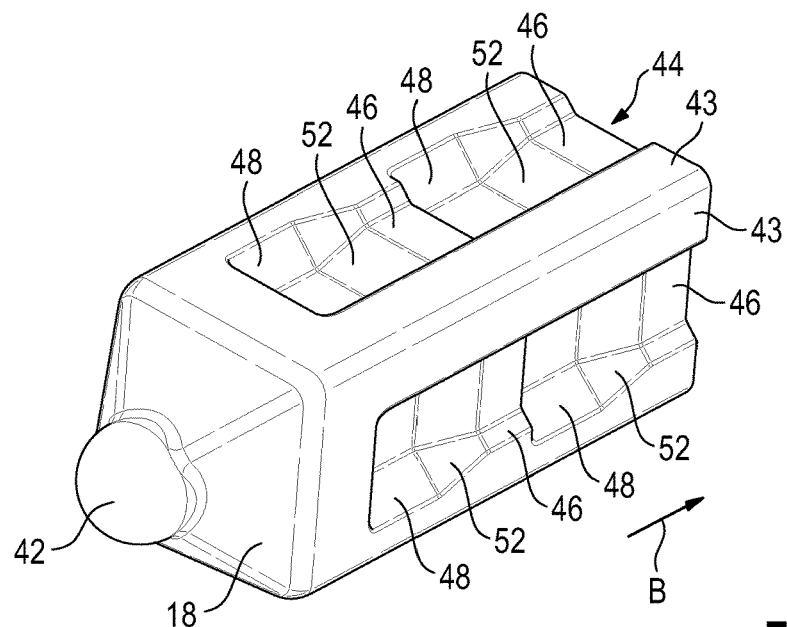
FIG. 5 shows the actuating element of the actuating assembly of FIG. 2.

As can be seen in particular in FIGS. 3 and 4, two spring elements 28 are provided in the seat between the seat 20 and the actuating element 18, which each press the actuating element 18 against the opposite inner wall 38 of the seat 20 with a spring force F.

As is apparent in particular from FIG. 4, the spring elements 28 are made in one piece from a bent sheet metal part 30. The bent sheet metal part 30 has a basic section 32 which is attached to a projection 34 on the front face 26 of the seat 20. The spring elements 28 each protrude from the basic section 32 at rights angles to each other and are bent over at right angles immediately behind the basic section 32.

In the embodiment shown here, the spring elements 28 have an undulating shape and rest by sections 36 against the inner wall 38 of the seat 20. Provided between the sections 36 are protruding sections 40 which project from the inner wall 38 towards the actuating element 18 and rest against the actuating element 18. The spring elements 28 are each held in a groove 41.

The actuating element 18 also has a substantially square cross-section. A projection 42 is provided on a rear end as viewed in the actuating direction B, the projection 42 being adapted to engage in a detent cam surface provided on the vehicle-fixed bearing.

Figure 6:
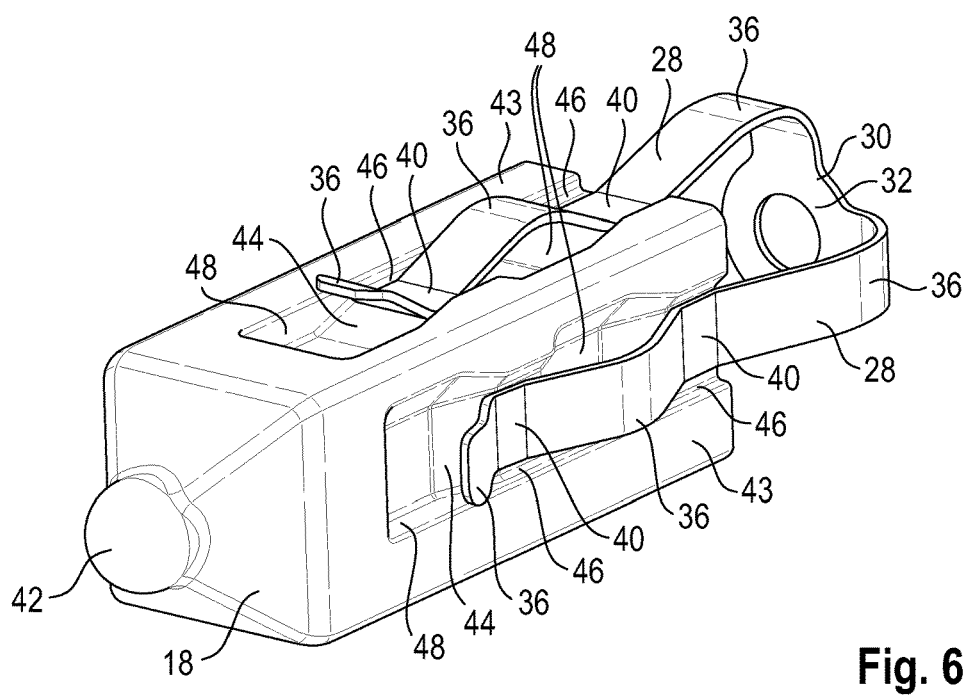
FIG. 6 shows the actuating element of FIG. 5 with a spring element.

The side faces 43 of the actuating element 18 are provided with grooves 44 which extend in the actuating direction B and against which the spring elements 28 rest (FIGS. 3 and 6). Provided in the grooves 44 there are a plurality of projections 46 located one behind the other in the actuating direction B and depressions 48 disposed between the projections 46.

As shown in FIG. 3 in the basic position the protruding sections 40 of the spring elements 28 each rest against a projection 46 of the actuating element 18.

The actuating element 18 is therefore pressed against the respective opposite inner wall 38 of the seat 20 by the spring elements 28 with a spring force F, so that the actuating element 18 is mounted free of clearance. The seat 20 and the actuating element 18 each have a rigid configuration. The spring force F, which presses the actuating element 18 against the inner wall 38 of the seat 20, is thus provided exclusively by the spring elements 28.

As can be seen in particular in FIG. 4, the inner wall 38 is provided with guide members 50 against which the actuating element 18 is pressed. These guide members 50 may be formed such that the friction between the actuating element 18 and the guide members 50 is reduced, so that the actuating element 18 can be moved in the actuating direction B involving a smaller resistance.

Respective ramps 52 are provided between the projections 46 and the depressions 48 located behind the projections 46 as viewed in the actuating direction B. When the actuating element 18 is shifted in the actuating direction B, the protruding sections 40 of the spring elements 28 will reach these ramps 52 and, upon further shifting, will move into the depressions 48.

With the protruding sections 40 arranged in the depressions, the spring force F, which presses the actuating element 18 against the guide members 50, is reduced so that the actuating element 18 can be shifted in the actuating direction B by a smaller force. But the actuating element 18 is pressed against the guide members 50 also in these positions, so that the actuating element 18 is mounted free of clearance.

When the actuating element 18 is shifted from the basic position to an actuation position, the ramps 52 provide the advantage that as soon as the protruding sections 40 rest against the ramps 52, a small actuating force is exerted on the actuating element 18 by the spring element 28 in the actuating direction B. This force is considerably smaller than the restoring force provided by the spring 24. But since this force acts in the actuating direction B, it reduces the force that is required for shifting the actuating element 18. As a result, the increased friction between the actuating element 18 and the seat 20 as caused by the spring force F, which presses the actuating element 18 against the inner wall of the seat 20 transversely to the actuating direction B, can be partly compensated.

In the embodiment shown here, the actuating assembly 16 includes two spring elements 28 which are arranged offset substantially by 90 degrees, so that they act on the actuating element 18 in two mutually perpendicular directions.

The number of spring elements 28 may, however, be adjusted as desired. In particular, it is conceivable that only one spring element 28 is used which, in the case of a square cross-section, for example, may be arranged in a corner and urge the actuating element 18 into the opposite corner.

The shape and material of the spring element 28 may be adjusted as desired. It should only be ensured that the spring element 28 exerts a spring force F that acts transversely to the actuating direction B on the actuating element 18. An exchange or an adjustment of the spring element 28 allows a rapid elimination of the clearance between the actuating element 18 and the seat 20.

The invention claimed is:

1. An actuating assembly (16) for a steering column stalk (10), comprising
   an actuating element (18) that is adapted to be shifted in an actuating direction (B) between a basic position and at least one actuation position,
   a seat (20) in which the actuating element (18) is shiftably supported, wherein at least one separate spring element (28) is provided between the seat (20) and the actuating element (18) and presses on the actuating element (18) by a spring force (F) acting substantially transversely to the actuating direction (B), and
   guide members (50) located substantially opposite to the at least one spring element (28) and provided in the seat (20), the at least one spring element (28) pressing the actuating element (18) into engagement with a respective inner wall of the seat opposite the spring element.

2. The actuating assembly according to claim 1, wherein the spring element (28) extends within the seat (20) in the actuating direction (B) and rests against an inner wall of the seat (20) at least in sections.

3. The actuating assembly according to claim 2, wherein the spring element (28) includes protruding sections (40) which project from the inner wall of the seat (20).

4. An actuating assembly (16) for a steering column stalk (10), comprising:
   an actuating element (18) that is adapted to be shifted in an actuating direction (B) between a basic position and at least one actuation position, wherein at least one projection (46) and/or one depression (48) is provided on the actuating element (18), and
   a seat (20) in which the actuating element (18) is shiftably supported, wherein at least one separate spring element (28) is provided between the seat (20) and the actuating element (18) and presses on the actuating element (18) by a spring force (F) acting substantially transversely to the actuating direction (B), the spring element (28) resting, when said actuating element (18) is in the basic position, by a protruding section (40) against a projection (46) formed on an outer lateral face of the actuating element (18), and/or resting in a depression (48) formed on said outer lateral face of the actuating element (18) when said actuating element (18) is in an actuation position.

5. The actuating assembly according to claim 4, wherein a ramp (52) for the protruding section (40) of the spring element is provided between a projection (46) and a depression (48) located behind the projection in the actuating direction (B).

6. The actuating assembly according to claim 1, wherein the spring element (28) is a bent sheet metal part (30) which is pre-bent.

7. The actuating assembly according to claim 1, wherein two spring elements (28) are provided which are arranged offset by 90 degrees in the circumferential direction.

8. A steering column stalk (10) comprising a mounting (12) for supporting the steering column stalk (10) or a steering column, and comprising an actuating assembly (16) according to claim 1, wherein the seat (20) of the actuating assembly (16) is formed integrally with the steering column stalk (10).

9. A steering column stalk assembly comprising a steering column stalk (10) according to claim 8 and a vehicle-fixed bearing for accommodation of the mounting (12) of the steering column stalk (10), wherein the bearing includes a detent cam surface into which the actuating element (18) can engage.

10. The actuating assembly according to claim 1, wherein the at least one spring element comprises a first spring element pressing a first side of the actuating element in a first direction perpendicular to the actuation direction and a second spring element pressing a second side of the actuating element in a second direction perpendicular to the actuation direction and perpendicular to the first direction.

11. The actuating assembly according to claim 1, wherein the at least one spring element presses the actuating element when the actuating member is in the basic position and the actuating position.

12. The actuating assembly according to claim 1, wherein each of the at least one spring element presses the actuating element into engagement with a respective inner wall of the seat opposite the spring element.

13. An actuating assembly for a steering column stalk in a vehicle comprising:
   a seat having an axial end defining a face;
   an actuating element adapted to be shifted within the seat in an actuating direction between a basic position and an actuation position, and
   at least one separate spring element provided between the seat and the actuating element for applying a spring force to the actuating element when the actuating element is in the basic position and the actuating position in a direction substantially transversely to the actuating direction, the at least one spring element being integrally formed with a basic section abutting the face of the seat.

14. An actuating assembly for a steering column stalk in a vehicle comprising:
   a seat;
   an actuating element adapted to be shifted within the seat in an actuating direction between a basic position and an actuation position, and
   at least one separate spring element provided between the seat and the actuating element for applying a spring force to the actuating element when the actuating element is in the basic position and the actuating position in a direction substantially transversely to the actuating direction, wherein the at least one spring element comprises a first spring element pressing a first side of the actuating element in a first direction perpendicular to the actuation direction and a second spring element pressing a second side of the actuating element in a second direction perpendicular to the actuation direction and perpendicular to the first direction.

15. An actuating assembly for a steering column stalk in a vehicle comprising:
   a seat;
   an actuating element adapted to be shifted within the seat in an actuating direction between a basic position and an actuation position, and
   at least one separate spring element provided between the seat and the actuating element for applying a spring force to the actuating element when the actuating element is in the basic position and the actuating position in a direction substantially transversely to the actuating direction, wherein the at least one spring element presses the actuating element into engagement with a respective inner wall of the seat opposite the spring element.

16. The actuating assembly according to claim 13, wherein the actuating element is rectangular and includes a plurality of sides, each spring element having a rectangular shape extending longitudinally along one of the sides.

17. The actuating assembly according to claim 14, wherein the actuating element is rectangular and includes a plurality of sides, each spring element having a rectangular shape extending longitudinally along one of the sides.

18. The actuating assembly according to claim 15, wherein the actuating element is rectangular and includes a plurality of sides, each spring element having a rectangular shape extending longitudinally along one of the sides.

19. The actuating assembly according to claim 3, wherein the spring element has an undulating configuration.

20. The actuating assembly according to claim 6, wherein the spring element is pre-bent in an undulating shape.

21. The actuating assembly according to claim 7, wherein the two spring elements are formed integrally with each other.

* * * * *